(12) United States Patent
Shah

(10) Patent No.: US 9,542,376 B2
(45) Date of Patent: Jan. 10, 2017

(54) SYSTEM AND METHOD FOR CREATING, EDITING, AND NAVIGATING ONE OR MORE FLOWCHARTS

(71) Applicant: Sehul S. Shah, Fremont, CA (US)

(72) Inventor: Sehul S. Shah, Fremont, CA (US)

( * ) Notice: Subject to any disclaimer, the term of this patent is extended or adjusted under 35 U.S.C. 154(b) by 154 days.

(21) Appl. No.: 14/103,164

(22) Filed: Dec. 11, 2013

(65) Prior Publication Data
US 2015/0160811 A1 Jun. 11, 2015

(51) Int. Cl.
*G06F 3/0482* (2013.01)
*G06F 17/24* (2006.01)

(52) U.S. Cl.
CPC ............. *G06F 17/24* (2013.01); *G06F 3/0482* (2013.01)

(58) Field of Classification Search
CPC ............................. G06F 3/0484; G06F 3/0482
USPC .......................................................... 715/855
See application file for complete search history.

(56) References Cited

U.S. PATENT DOCUMENTS

| | | | | | |
|---|---|---|---|---|---|
| 5,546,529 | A * | 8/1996 | Bowers | ............. | G06F 17/30991 707/E17.141 |
| 5,608,898 | A * | 3/1997 | Turpin | ....................... | G06F 8/34 |
| 6,437,812 | B1 * | 8/2002 | Giles | ..................... | G06F 3/0481 715/853 |
| 7,096,210 | B1 * | 8/2006 | Kramer | .................. | G06N 5/025 706/11 |
| 7,120,901 | B2 * | 10/2006 | Ferri | ................... | G06F 11/3636 714/45 |
| 7,155,421 | B1 * | 12/2006 | Haldar | ................... | G06N 5/003 705/12 |
| 7,321,883 | B1 * | 1/2008 | Freedy | .................. | G06Q 10/00 706/45 |
| 7,647,577 | B2 * | 1/2010 | Wang | ........................ | G06F 8/10 717/104 |
| 7,669,147 | B1 * | 2/2010 | Molander | ............. | G06F 3/0482 707/693 |
| 8,266,580 | B2 | 9/2012 | Wang et al. | | |
| 8,341,610 | B2 | 12/2012 | Beygelzimer et al. | | |
| 8,423,482 | B2 | 4/2013 | Gansner | | |
| 2002/0107893 | A1 * | 8/2002 | Ohkouchi | ......... | G06F 17/30961 715/276 |
| 2003/0007002 | A1 * | 1/2003 | Hida | .................... | G06T 11/206 715/734 |

(Continued)

FOREIGN PATENT DOCUMENTS

EP 0510514 A1 10/1992
WO 00/63765 A1 10/2000

*Primary Examiner* — Reza Nabi
*Assistant Examiner* — Daniel Rodriguez
(74) *Attorney, Agent, or Firm* — Morrison & Foerster LLP

(57) ABSTRACT

Systems and processes are described for creating, editing, and navigating one or more flowcharts. A process includes causing display of a graphical user interface having a plurality of display regions. The plurality of display regions including at least a first, a second, and a third display region. Each display region is for displaying a node of a plurality of nodes in the one or more flowcharts. The plurality of nodes are connected by a plurality of logic paths and the total number of display regions is less than the total number of hierarchical levels in the one or more flowcharts. Additionally, the process includes causing display of a first node in the first display region and a second node in the second display region. A first logic path connects from the first node to the second node.

27 Claims, 21 Drawing Sheets

(56) References Cited

U.S. PATENT DOCUMENTS

| | | | |
|---|---|---|---|
| 2003/0036813 A1* | 2/2003 | Gasiorek | G05B 19/0426 700/87 |
| 2003/0050916 A1* | 3/2003 | Ortega | G06F 3/0482 |
| 2006/0095474 A1* | 5/2006 | Mitra et al. | 707/104.1 |
| 2006/0156257 A1* | 7/2006 | Chen | G09B 7/00 715/859 |
| 2007/0094060 A1* | 4/2007 | Apps | G06F 17/30398 705/7.36 |
| 2008/0065977 A1* | 3/2008 | Gottlieb et al. | 715/203 |
| 2008/0163084 A1* | 7/2008 | Gottlieb | G11B 27/034 715/762 |
| 2008/0184362 A1* | 7/2008 | Kumhyr | G06F 21/46 726/18 |
| 2008/0186133 A1* | 8/2008 | Parkhurst | G01N 35/00613 340/5.8 |
| 2009/0113350 A1* | 4/2009 | Hibino | G06F 17/30061 715/853 |
| 2009/0119392 A1* | 5/2009 | Bonjour | H04L 41/16 709/223 |
| 2009/0288034 A1* | 11/2009 | Childress | G06F 17/241 715/781 |
| 2010/0211638 A1* | 8/2010 | Rougier | H04L 67/34 709/205 |
| 2011/0078426 A1* | 3/2011 | Stoitsev | 712/244 |
| 2011/0161174 A1* | 6/2011 | Simms | G06F 17/30029 705/14.58 |
| 2011/0307460 A1* | 12/2011 | Vadlamani et al. | 707/706 |
| 2012/0133657 A1* | 5/2012 | Ueno et al. | 345/440 |
| 2012/0166425 A1* | 6/2012 | Sharma | G06F 17/30696 707/722 |
| 2012/0256925 A1* | 10/2012 | Stannard | G06T 11/206 345/440 |
| 2013/0111375 A1* | 5/2013 | Frohliger | 715/763 |
| 2013/0117280 A1* | 5/2013 | Donaldson | G06F 17/30129 707/748 |
| 2013/0120548 A1* | 5/2013 | Li | G06K 9/00604 348/78 |
| 2014/0214810 A1* | 7/2014 | Takeda | G06F 17/30395 707/722 |
| 2014/0281879 A1* | 9/2014 | Lukes | G06F 17/3089 715/234 |
| 2014/0282118 A1* | 9/2014 | Kumamoto | G06F 3/0481 715/760 |
| 2014/0282199 A1* | 9/2014 | Basu | G06F 3/0484 715/772 |
| 2015/0039657 A1* | 2/2015 | Roth | G06Q 10/06 707/805 |
| 2015/0149912 A1* | 5/2015 | Moore | 715/736 |

* cited by examiner

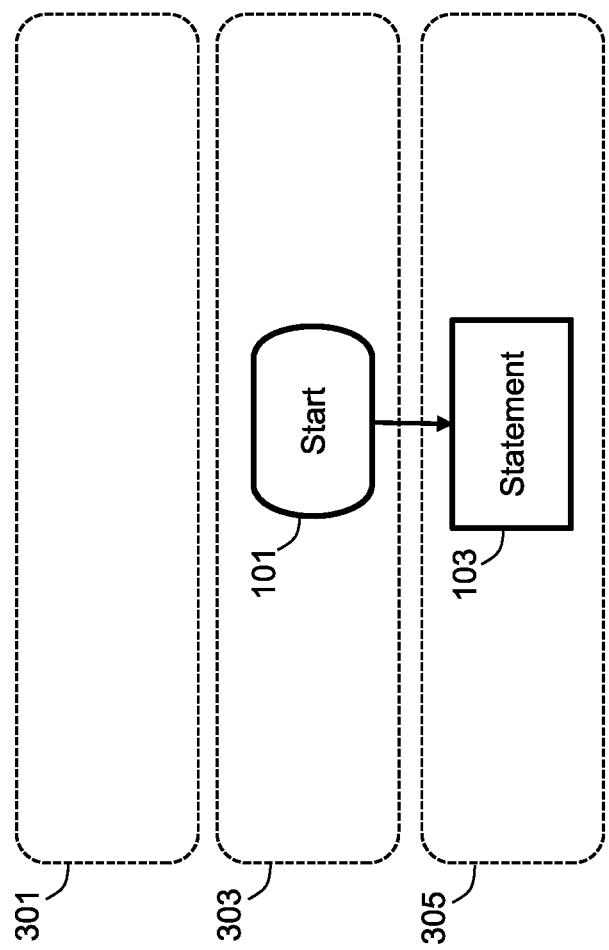

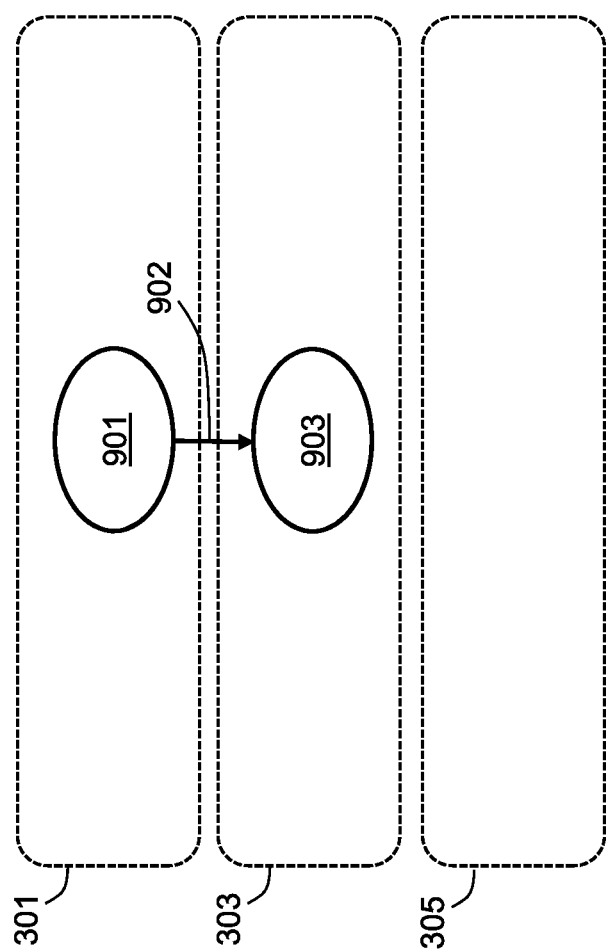

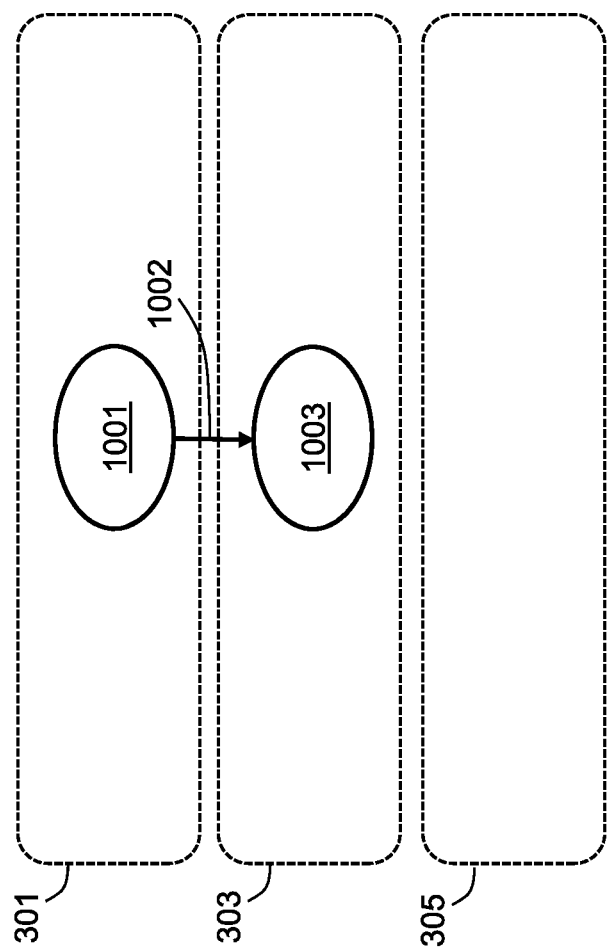

SYSTEM AND METHOD FOR CREATING, EDITING, AND NAVIGATING ONE OR MORE FLOWCHARTS

BACKGROUND

1. Field

The present disclosure relates generally to digital content systems and, more specifically, to systems and methods for creating, editing, and navigating one or more flowcharts.

2. Related Art

Consumers frequently rely on the internet as a convenient resource for assisting with decision making or goal reaching. For example, consumers may perform research to understand which car would best fit their needs or what steps are required to become elected as the president of the United States. However, information obtained from the internet is often fragmented, poorly organized, and difficult to understand. A significant amount of time is typically spent parsing through large volumes of information to determine its relevance to the problem being researched. Some internet site providers offer access to flowcharts that may help consumers with their decision making or goal reaching. However, such flowcharts are often complex, information rich and thus difficult to navigate. A flowchart representing a complex process typically includes multiple hierarchical levels where each level has multiple nodes. Each node may represent one or more steps in a complex process and the nodes are linked together by logic paths. Often, nodes present compound questions or represent multiple steps, which confuse the user. Additionally, four or more nodes may logically flow from a single node, thus making it difficult for a user to determine which logical path to take. Accordingly, consumers often encounter problems navigating through such flowcharts.

SUMMARY

In an exemplary process for creating, editing, and navigating through one or more flowcharts, a graphical user interface having a plurality of display regions is caused to be displayed. The plurality of display regions includes at least a first, a second, and a third display region. Each display region is for displaying a node of a plurality of nodes in the one or more flowcharts. The plurality of nodes are connected by a plurality of logic paths and the total number of display regions is less than the total number of hierarchical levels in the one or more flowcharts. Additionally, the process includes causing display of a first node in the first display region and a second node in the second display region. A first logic path connects from the first node to the second node.

BRIEF DESCRIPTION OF THE FIGURES

The present application can be best understood by reference to the following description taken in conjunction with the accompanying drawing figures, in which like parts may be referred to by like numerals.

FIGS. 8A-8D illustrate an exemplary process for navigating through one or more flowcharts using an exemplary graphical user interface FIGS. 9A-9B illustrate an exemplary process for adding a node to a flowchart using an exemplary graphical user interface.

FIGS. 10A-10B illustrate an exemplary process for logically linking a first flowchart to a second flowchart using an exemplary graphical user interface.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

In exemplary systems and methods for creating, editing, and navigating through one or more flowcharts described herein, a graphical user interface having multiple display regions is caused to be displayed. Each display region is for displaying a node of multiple nodes in the one or more flowcharts. The flowcharts may represent decision making or goal reaching processes. In the examples provided below, the graphical user interface includes a first, a second, and a third display region. The second display region may display the node under consideration by the user. The first and third display regions may display the nodes that logically flow before and after the node under consideration respectively. A user may navigate up or down one or more flowcharts by selecting the nodes displayed in the first and third display regions. Additionally, a user may add or insert a node to the one or more flowcharts using the graphical user interface. By only displaying a portion of the one or more flowcharts, the graphical user interface described herein enables creating, editing, and navigating complex flowcharts to be done easily and intuitively. Accordingly, decision making and goal reaching using flowcharts is facilitated by the graphical user interface described herein.

1. Streamlined Flowcharts

Figure 1:
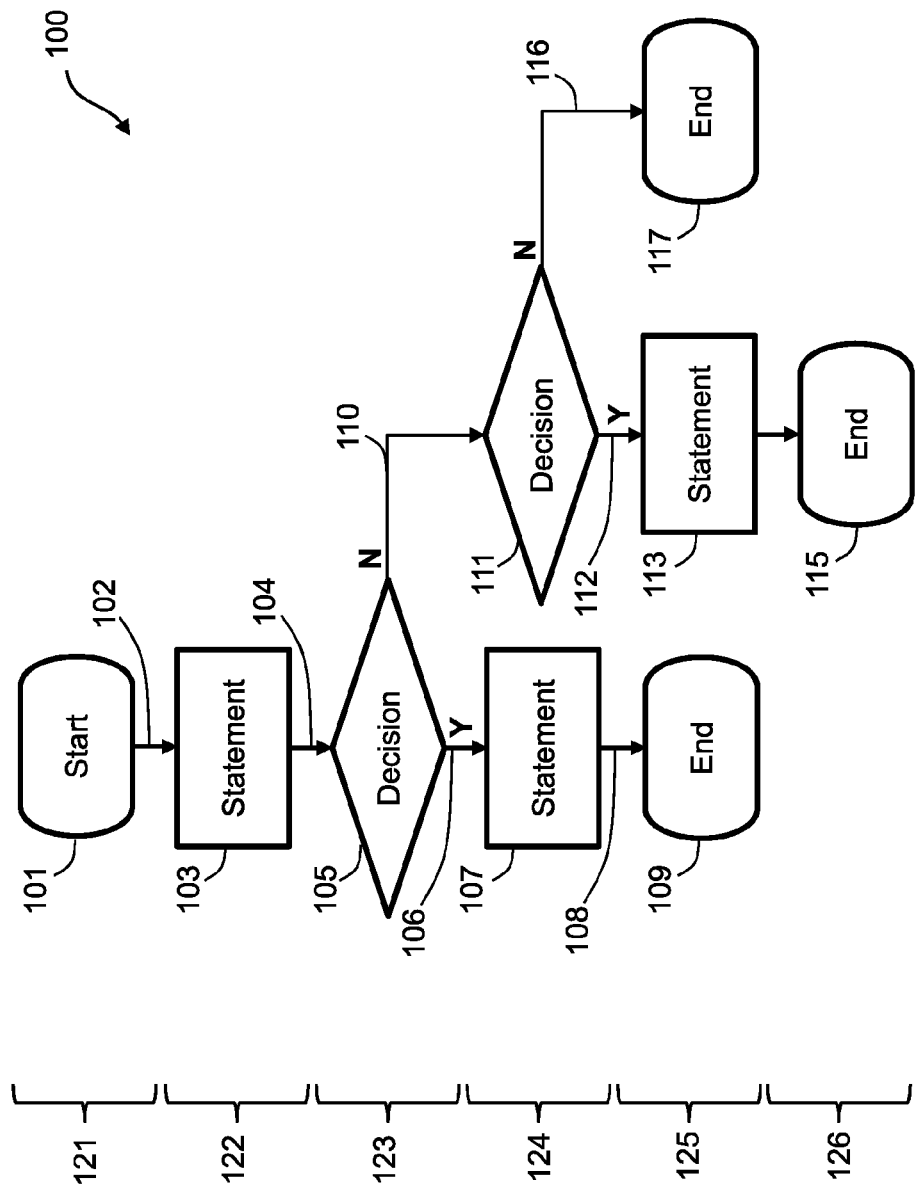
FIG. 1 illustrates an exemplary streamlined flowchart.

FIG. 1 illustrates an exemplary streamlined flowchart 100. Unlike conventional flowcharts, streamlined flowcharts have features and restriction that simplify the flowcharts, thereby making them easier and more intuitive to understand. For example, streamlined flowcharts may include limited node types, (e.g., start, end, statement, and question nodes) and each node may have a character limit (e.g., maximum 160 characters or maximum 200 characters). Thus, compared to conventional flowcharts, streamlined flowcharts may be quicker and simpler to create, edit, and navigate through.

As shown in FIG. 1, flowchart 100 includes multiple nodes connected by multiple logic paths. For example, logic path 104 connects from statement node 103 to decision node 105. Additionally, flowchart 100 includes hierarchical levels where the nodes of a lower level logically flow from the nodes of a higher level. For example, nodes 109, 113, and 117 in level 125 logically flow from nodes 107 and 111 in level 124. In this example, flowchart 100 has six hierarchical levels 121-126. It should be recognized that flowchart 100 may have any number of nodes and any number of hierarchical levels. Flowchart 100 may represent a process, such as, a decision making or goal reaching process. In one example, flowchart 100 may represent a decision making process for determining what car to purchase. In another example, flowchart 100 may represent a goal reaching process of becoming elected as the president of the United States.

Each node in flowchart 100 may represent a step in a process. Flowchart 100 may include only a limited number of node types. In this example, flowchart 100 has only four types of nodes: start node, end nodes, statement nodes, and decision nodes. Although in the present example, flowchart 100 has four node types, it should be recognized that the number of node types in flowchart 100 may vary. For example, flowchart 100 may have five node types or less than ten node types. As shown in FIG. 1, flowchart 100 begins at start node 101 and logically concludes at end nodes 109, 115, 117. End nodes 109, 115, 117 may represent conclusions to a process. In one example, end nodes 109, 115, 117 may represent conclusions regarding what car to purchase. In another example, end nodes 109, 115, 117 may represent conclusions regarding whether or not presidency in the United States is achieved.

As shown in FIG. 1, statement nodes 103, 107, 113 and decision nodes 105, 111 are disposed between start node 101 and end nodes 109, 115, 117. Statement nodes 103, 107, 113 may provide instructions or relevant information regarding the steps in the process. For example, statement node 103 may inform the user to file a particular form in the process of becoming elected as the president of the United States. Decision nodes 105, 111 may present questions (e.g., a "yes/no" question) to the user to help direct the user to the appropriate logic path. For example, decision node 105 may ask the user whether they were born in the United States and the answer would determine whether the user should follow logic path 106 to statement node 107 or logic path 110 to decision node 111. Restricting flowchart 100 to having only start, end, statement, and decision nodes keeps flowchart 100 simple and easy to create, edit, and navigate.

Flowchart 100 may include several additional restrictions that streamline the flowchart. One restriction may be that each statement node in flowchart 100 is connected only to two logic paths: one flowing to the statement node and one flowing from the statement node. For example, statement node 103 is only connected to logic path 102 flowing to statement node 103 from start node 101 and logic path 104 flowing from statement node 103 to decision node 105.

Another restriction in flowchart 100 may be that each decision node in flow chart 100 presents a question having a limited number of possible answers. For example, the presented question may have only two possible answers. In one such example, the presented question may prompt either a "yes" or a "no" response. In another example, the presented question may have only three possible answers. In one such example, the presented question may prompt either a "yes", a "no", or a "maybe" response. Restricting the number of possible answers in decision nodes prevents compound questions and avoids confusion to a user. Thus each decision node may be connected to a limited number of logic paths. In the example shown in FIG. 1, each decision node may be connected to only three logic paths: one flowing to the decision node and two flowing from the decision node. Decision node 105 is connected to only logic path 104 flowing to decision node 105 and logic paths 106 and 110 flowing from decision node 105. Decision node 105 may present a yes/no question to the user where logic paths 106 to statement node 107 may represent a "yes" response and logic path 110 to decision node 111 may represent a "no" response. Accordingly, in flowchart 100, there are at most two logic paths that connect to a node and logically flow from that node.

A further restriction in flowchart 100 may be that each statement or question in a statement or decision node respectively is restricted to a character length limit. For example, the character length limit may be 160 characters or less. In another example, the character length limit may be 200 characters or less. This keeps the statements or questions in each node short and direct and thus discourages lengthy statements and compound questions which may cause confusion. Additionally, the character length limit may enable the use of SMS/texting platforms for navigating through flowchart 100.

Figure 2:
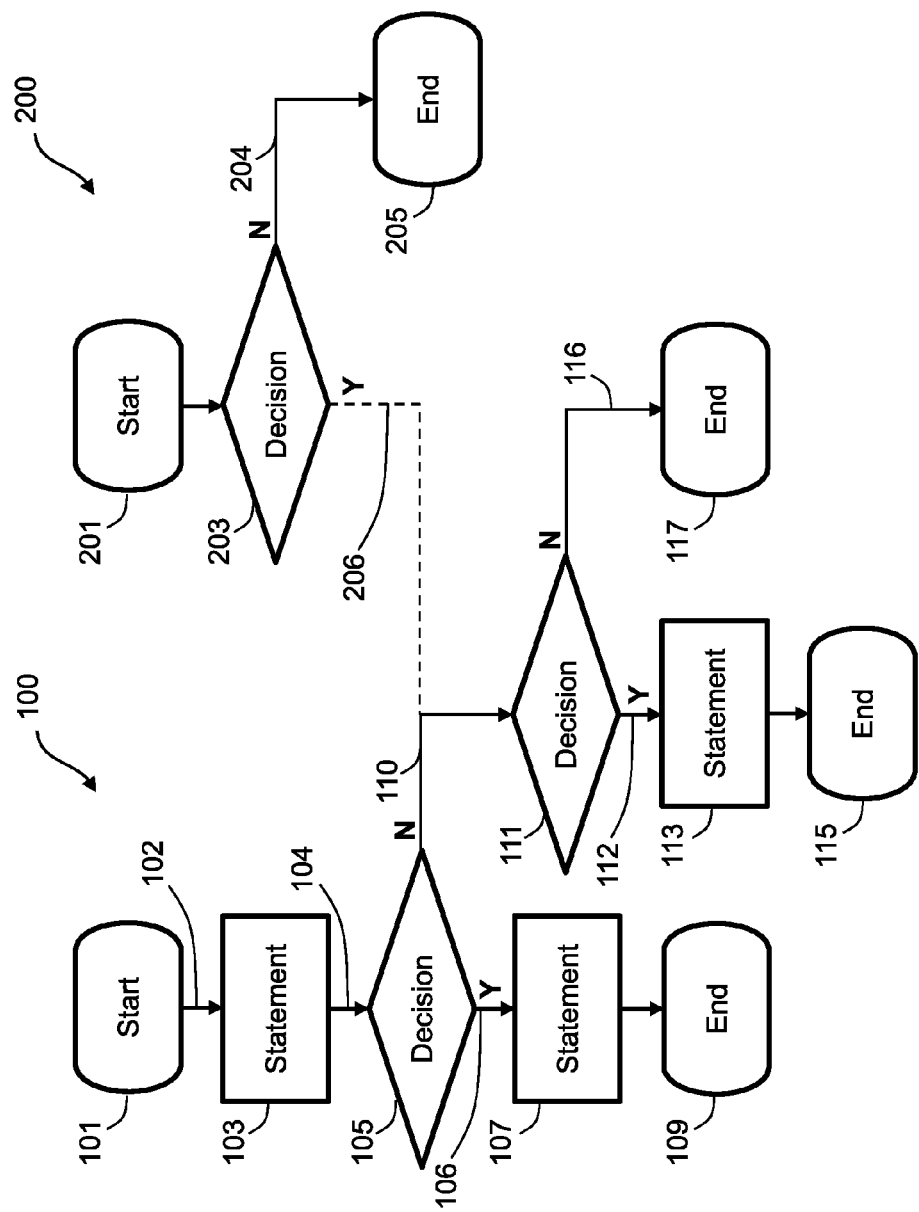
FIG. 2 illustrates two exemplary streamlined flowcharts logically linked together.

Two or more streamlined flowcharts may be logically linked together. For example, as depicted in FIG. 2, flowchart 200 may be logically linked to flowchart 100. The flowcharts are logically linked by logic path 206 that connects from decision node 203 of flowchart 200 to decision node 111 of flowchart 100. It should be recognized that any number of flowcharts may be logically linked together.

In a specific example, flowcharts 100 and 200 may both represent goal-reaching processes for becoming the president of the United States. In such an example, decision node 203 of flowchart 200 may ask the user whether they are a natural-born citizen of the United States. A "no" response from the user may direct the user to end node 205 where the user is informed that the goal cannot be reached. A "yes" response however, may direct the user, via logic path 206, to decision node 111 of flowchart 100 where the user is guided through an applicable portion of flowchart 100 for reaching the goal.

2. Graphical User Interface

With reference to FIGS. 3-7, FIG. 3 depicts an exemplary graphical user interface 300 for creating, editing, and navigating through one or more flowcharts. FIGS. 4-7 each depict using an exemplary graphical user interface 300 to display the nodes of one or more flowcharts. Graphical user interface 300 may be used to quickly and efficiently create, edit, and navigate through one or more flowcharts. For example, graphical user interface 300 may be used to create, edit, and navigate through the streamlined flowcharts shown in FIGS. 1 and 2. In a specific example, graphical user interface 300 may be used exclusively to create, edit, and navigate through streamlined flowcharts.

Figure 3:
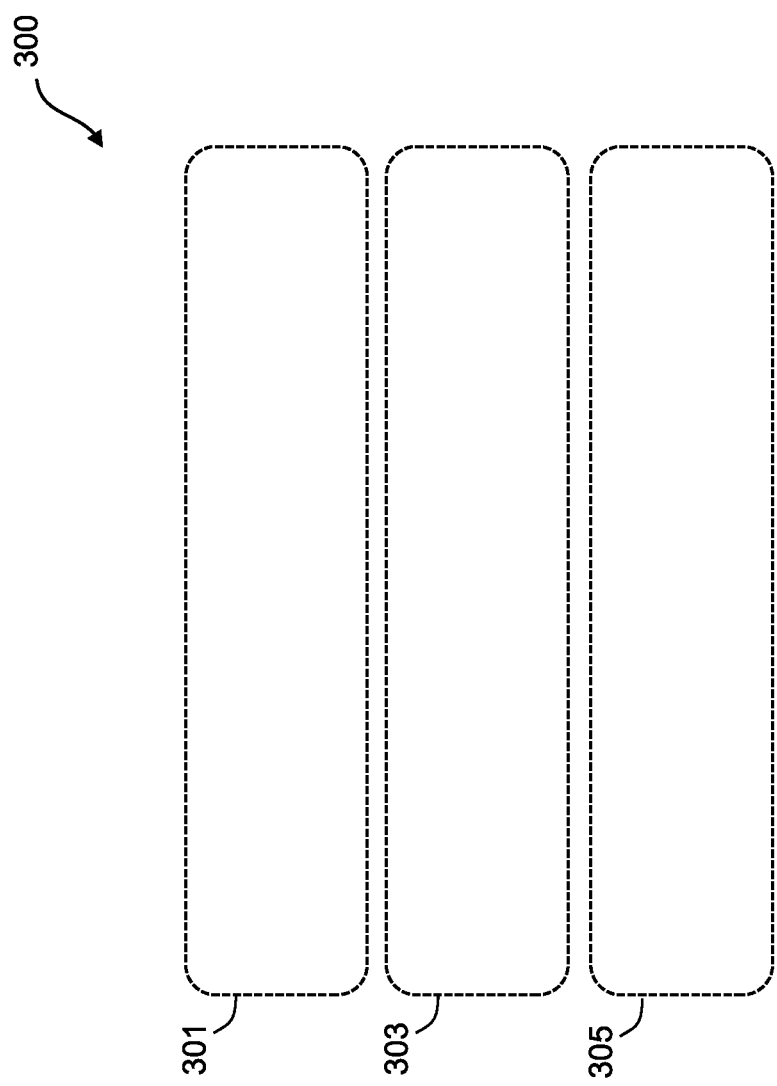
FIG. 3 illustrates an exemplary graphical user interface for creating, editing, and navigating one or more flowcharts.

As shown in FIG. 3, graphical user interface 300 includes display regions 301, 303, and 305. Display regions 301, 303, and 305 may have any suitable size and shape for displaying the nodes of one or more flowcharts. In some examples, display regions may be discrete windows on graphical user interface 300 that have defined borders or perimeters.

Figure 4:
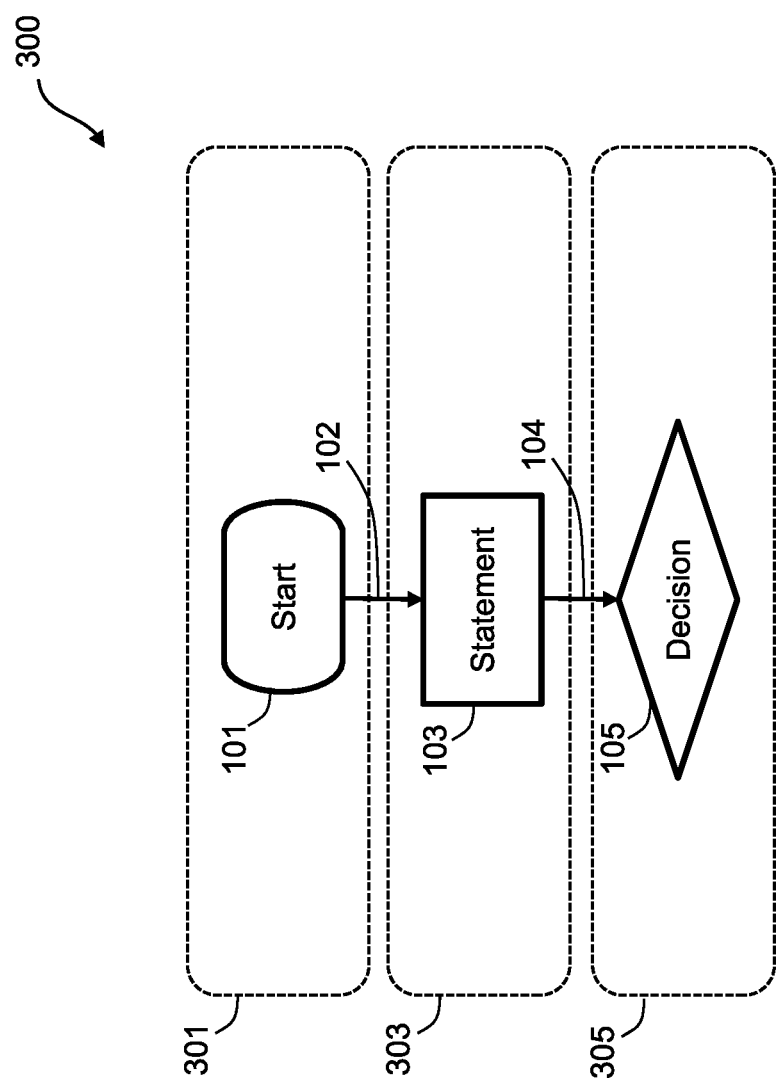
FIG. 4 illustrates an exemplary graphical user interface used to display the nodes of one or more flowcharts.
Figure 5:
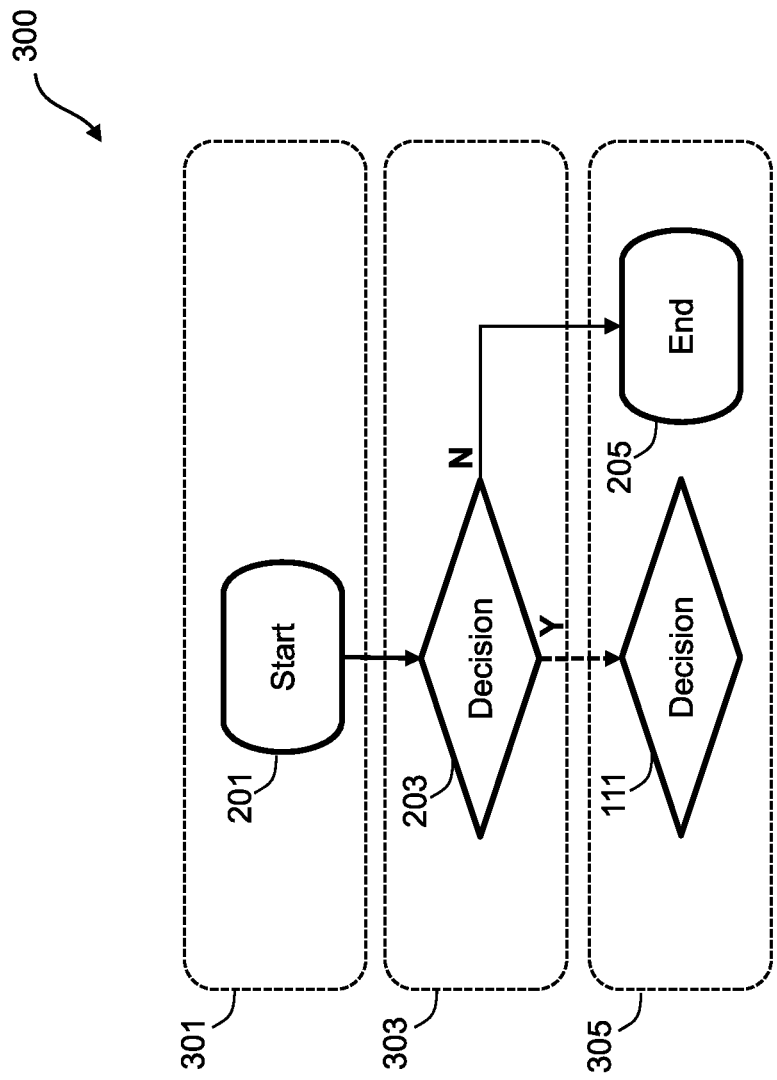
FIG. 5 illustrates an exemplary graphical user interface used to display the nodes of one or more flowcharts.
Figure 6:
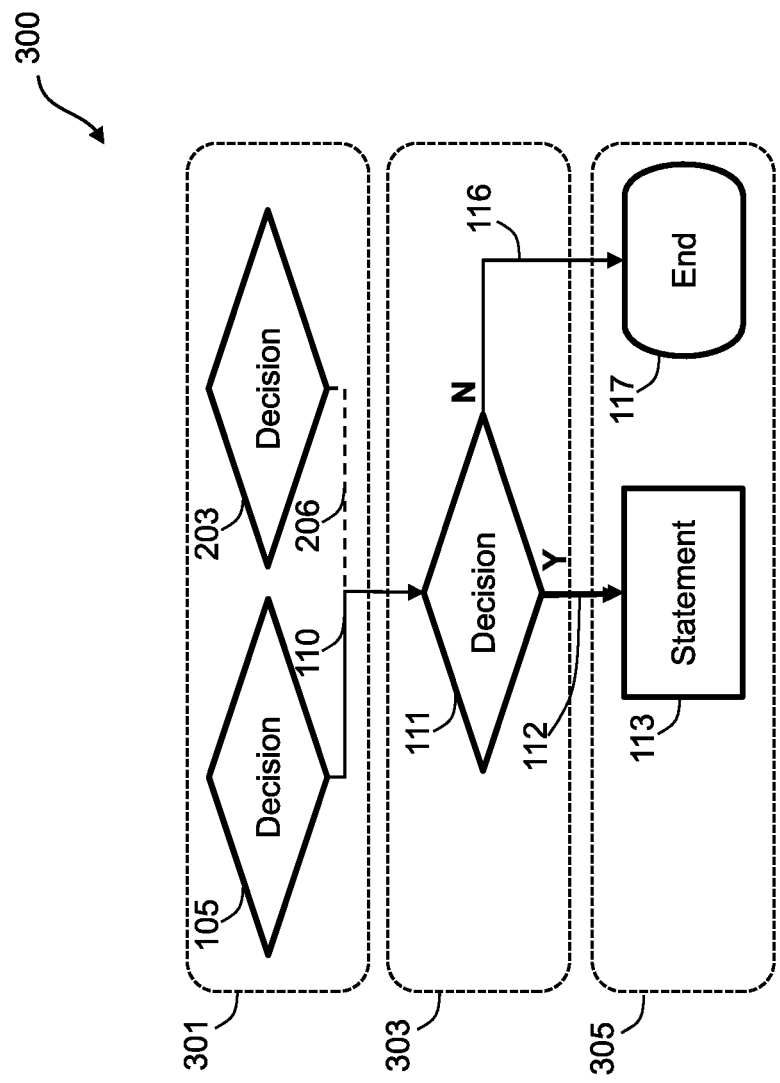
FIG. 6 illustrates an exemplary graphical user interface used to display the nodes of one or more flowcharts.
Figure 7:
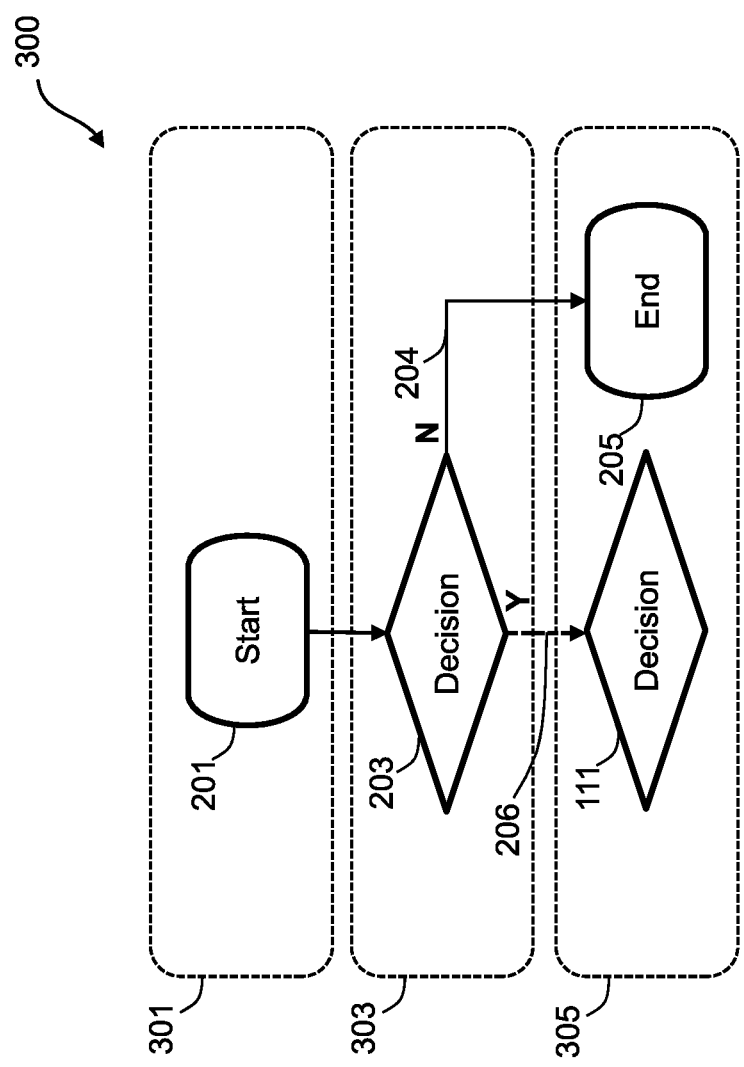
FIG. 7 illustrates an exemplary graphical user interface used to display the nodes of one or more flowcharts.

Display regions 301, 303, and 305 may display a portion of a flowchart that logically flows together. For example, as shown in FIG. 4, a portion of flowchart 100 (e.g., nodes 101, 103, and 105) that logically flow together may be displayed. In another example, display regions 301, 303, and 305 may function to display portions of one or more flowcharts that logically flow together. For example, as shown in FIG. 5, a portion of a flowchart 200 from FIG. 2 (nodes 201, 203, and 205) and a portion of a flowchart 100 from FIG. 2 (node 111) that logically flow together may be displayed. Displaying only a portion of a flowchart allows a user to focus only on a relevant portion of a flowchart and prevents the user from becoming confused or overwhelmed by the entire flowchart.

With reference to FIG. 3, display region 303 may display a node of a flowchart. In some cases, display region 303 displays at most one node of a flowchart. In one such example, display region 303 may display only the node representing the process step under consideration. Displaying only the node under consideration serves to focus the user to the current relevant step in the process. The node under consideration may be the node selected by the user in a flowchart. For example, as shown in FIG. 4, display region 303 displays only statement node 103 where statement node 103 was selected by the user and statement node 103 represents the process step currently under consideration by the user. In some examples, the node displayed in display region 303 may be highlighted to help focus the user's attention to the node under consideration. For example, the node in display region 303 may be highlighted or emphasized by displaying the node in bold, in a larger size, or with a contrasting color.

Where graphical user interface 300 is used to create or edit a flowchart, display region 303 may display a node which the user is editing or deleting. Display region 303 may also display a node to which the user may add or insert another node (e.g., a statement, decision, or end node) that logically flows from it. Where graphical user interface 300 is used to navigate through a flowchart, display region 303 may display a node representing a step the user is currently performing in a decision making or goal reaching process. Exemplary processes for creating, editing, and navigating through a flowchart using graphical user interface 300 are described later in greater detail.

With reference to FIG. 3, display region 301 may display one or more nodes from which logic paths flow to the node in display region 303. The node or nodes displayed in display region 301 may have the highest hierarchical level among the nodes displayed in graphical user interface 300. Display region 301 may also display a node that was last selected by the user prior to selecting the node displayed in display region 303. Display region 301 allows a user to quickly determine the node that logically precedes the node under consideration in display region 303.

In the example shown in FIG. 4, display region 301 displays start node 101 of flowchart 100 and logic path 102 connects from start node 101 to statement node 103 in display region 303. Start node 101 has the highest hierarchical level in flowchart 100 among nodes 101, 103, and 105 displayed in graphical user interface 300. In another example shown in FIG. 6, display region 301 displays two nodes from two flowcharts. Node 105 of flowchart 100 and node 203 of flowchart 200 are displayed in display region 301. Logic path 110 connects from node 105 to node 111 in display region 305 and logic path 206 connects from node 203 to node 111 in display region 305. Logic path 206 logically links flowchart 200 to flowchart 100.

With reference to FIG. 3, display region 305 may display one or more nodes that logically flow from the node in display region 303. Logic paths connect from the node in display region 303 to each node in display region 305. The node or nodes displayed in display region 301 may have the lowest hierarchical level among the nodes displayed in graphical user interface 300. Display region 305 thus allows a user to quickly determine the node or nodes that logically succeed the node under consideration in display region 303.

In one example, display region 305 may display only one node that logically flows from the node in display region 303. In one such example shown in FIG. 4, display region 305 displays node 105 of flowchart 100 where logic path 104 connects from statement node 103 in display region 303 to decision node 105 in display region 305. In another example, display region 305 may display two nodes from a flowchart where the two nodes logically flow from a decision node in display region 303. In one such example shown to FIG. 6, nodes 113 and 117 of flowchart 100 are displayed in display region 305. Logic paths 112 and 116 connect from decision node 111 in display region 303 to nodes 113 and 117 respectively in display region 305. In yet another example, display region 305 may display two nodes from two flowcharts where the two nodes logically flow from a node in display region 303. In one such example shown to FIG. 7, node 111 of flowchart 100 and node 205 of flowchart 200 are displayed in display region 305. Logic paths 204 and 206 connect from node 203 in display region 303 to nodes 205 and 111 respectively in display region 305.

As previously mentioned, graphical user interface 300 allows the user to focus on the node under consideration in display region 303. Display regions 301 and 305 show the user the node or nodes in the flowchart that logically precede and succeed the node under consideration in display region 303. The nodes displayed in display regions 301 and 305 may be selectable by user. In one example, a node may be selectable by directly selecting the node itself. In another example, a node may be selectable by selecting the logic path connected to the node. Selecting a node in display regions 301 and 305 may cause the selected node to be displayed in display region 303. In this way, graphical user interface 300 may be used to simply and easily navigate up and down a flowchart.

Although in the examples described above, user interface 300 includes three display regions, it should be recognized that the specific number of display regions in user interface 300 may vary. In one example, user interface 300 may include four display regions. In such an example, the fourth display region may display one or more nodes that logically flow from the nodes in display region 305. Logic paths thus connect each node in display region 305 to the nodes in the fourth display region. In another example, the total number of display regions may be less than the total number of hierarchical levels in the one or more flowcharts.

Additionally, it should be recognized that the positions of the display regions may vary. Display regions may be positioned in any manner showing a logical flow between the nodes displayed in the display regions. For example, with reference to FIG. 3, display regions 301, 303, and 305 may be positioned in a manner that may represent a logical connection from first display region 301 to second display region 303 and a logical connection from second display region 303 to third display region 305.

3. Navigating a Flowchart

FIGS. 8A-8D depict an exemplary process for navigating one or more flowcharts using an exemplary graphical user interface. In this example, with reference to FIGS. 1 and 3, graphical user interface 300 may be used to navigate a user through flowchart 100. The use of graphical user interface 300 simplifies the navigation process through a flowchart, thereby making it easier and quicker for a user to make a decision or reach a desired goal.

Figure 8A:
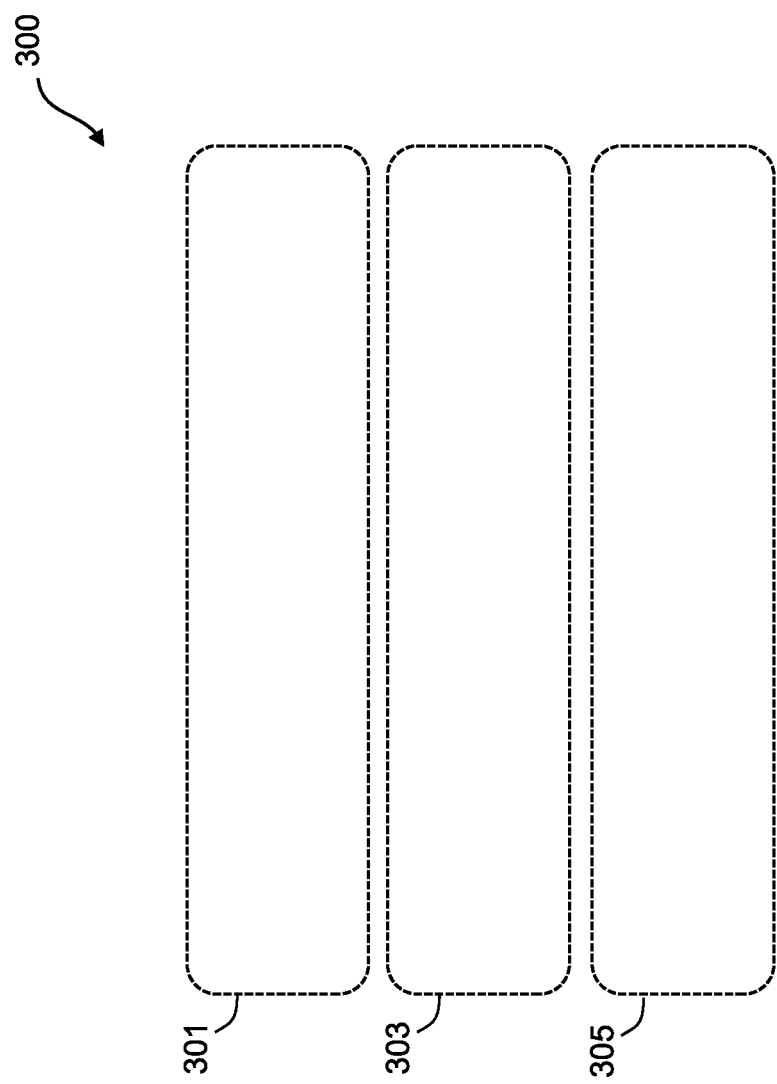

With reference to FIG. 8A, graphical user interface 300 may be displayed. For example, graphical user interface 300 may be displayed on the display screen of a user device. As previously described, graphical user interface 300 may include display regions 301, 303, and 305. Each display region may be for displaying one or more nodes of one or more flowcharts. In one example, the total number of display regions in graphical user interface 300 may be less than the total number of hierarchical levels in the one or more flowcharts. The flowchart may be a streamlined flowchart such as flowchart 100 previously described above with reference to FIG. 1.

Figure 8B:
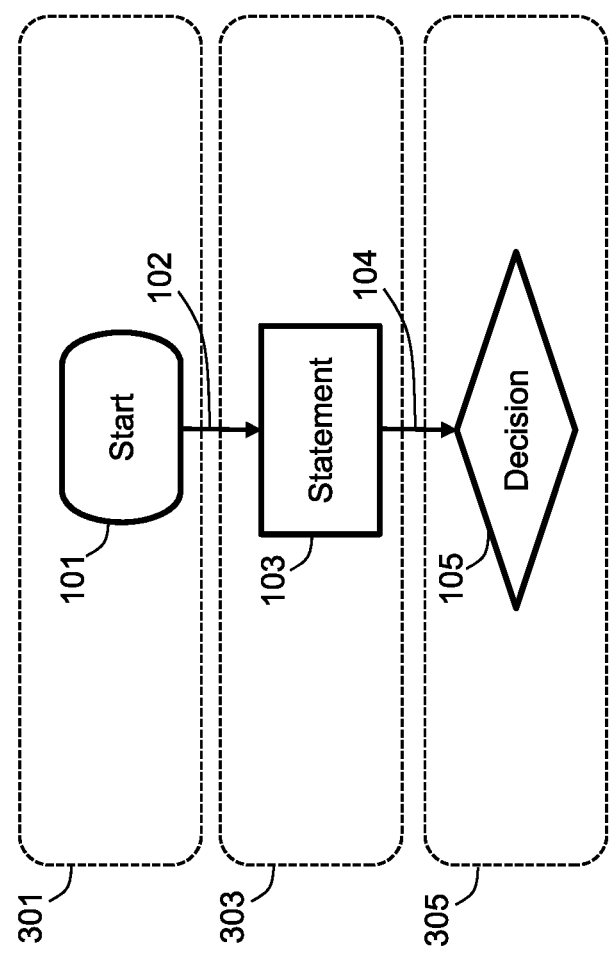

A node within a flowchart may be selected for navigation via input to graphical user interface 300. In the present example, node 103 in flowchart 100 may have been selected. With reference to FIG. 8B, the selection may cause start node 101 to be displayed in display region 301, statement node 103 to be displayed in display region 303, and decision node 105 to be displayed in display region 305. Logic path 102 connects from start node 101 to statement node 103 and logic path 104 connects from statement node 103 to decision node 105. Node 103 may be highlighted or emphasized in display region 103 to focus the user on the node under consideration.

The nodes displayed in display regions 301 and 305 may be selectable. In some cases, the nodes in display regions 301 and 305 may be selected by selecting, via input to graphical user interface 300, the nodes themselves. For example, with reference to FIG. 8B, node 105 in display region 305 may be selected by selecting, via input to graphical user interface 300, node 105. In other cases, the nodes in display regions 301 and 305 may be selected by selecting, via input to graphical user interface 300, the corresponding logic paths that connect to the nodes. For example, with reference to FIG. 8B, node 105 in display region 305 may be selected by selecting, via input to graphical user interface 300, logic path 104. In yet other cases, the nodes in display regions 301 and 305 may be selected via input to a suitable user interface such as a keyboard, a mouse, a touchscreen user interface, or the like. In the example shown in FIG. 8B where a statement node 103 is displayed in display region 303, node 105 in display region 305 may be selected by receiving a first input via a user interface (e.g., a down arrow key input on a keyboard, a right button click on a mouse, a downward swipe motion on a touchscreen, etc.). Similarly, node 101 in display region 301 may be selected by receiving a second input via a user interface (e.g., an up arrow key input on a keyboard, a left button click on a mouse, or an upward swipe motion on a touchscreen). In the example shown in FIG. 8C where decision node 105 is displayed in display region 303, node 107 in display region 305 may be selected by receiving a third user input (e.g., a "Y" key input on a keyboard) while node 111 is display region 305 may be selected by receiving a forth user input (e.g., an "N" key input on a keyboard). In this way, a user may easily navigate up and down the one or more flowcharts using various user interfaces.

Figure 8C:
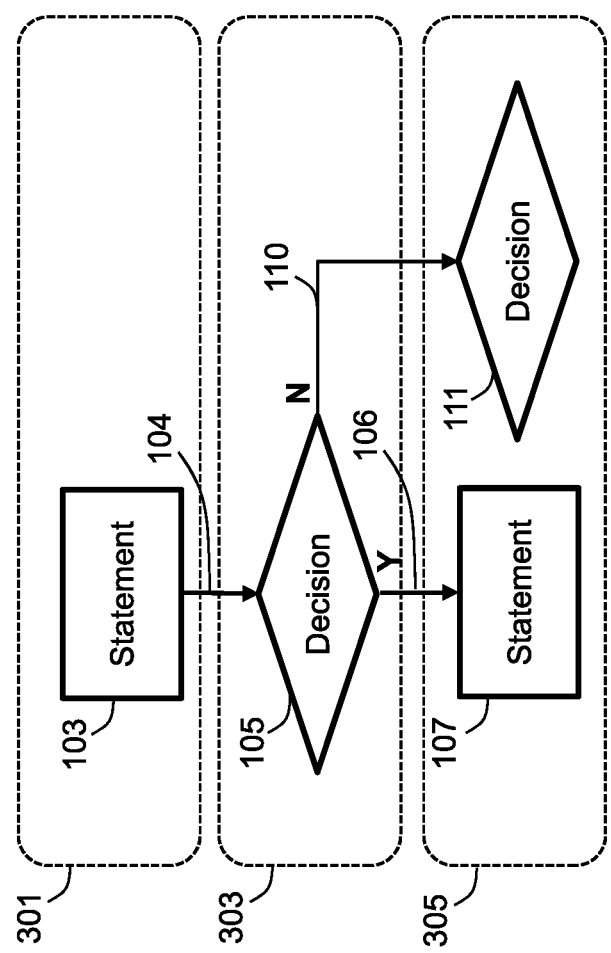

Selecting a node in display region 301 and 305 may cause the selected node to be displayed in display region 303 and thus navigates the user up or down the flowchart. In one example, with reference to FIG. 8B, node 105 in display region 305 may be selected via input to graphical user interface 300. Selecting node 105 may cause statement node 103 to be displayed in display region 301, decision node 105 to be displayed in display region 303, and nodes 107 and 111 to be displayed in display region 305, as shown in FIG. 8C. Logic paths 106 and 110 connect from decision node 105 to statement node 107 and decision node 111 respectively. Accordingly, a user may navigate down one or more flowcharts by selecting a node in display region 305.

In another example, with reference to FIG. 8B, node 101 in display region 301 may be selected via input to graphical user interface 300. Selecting node 101 may cause start node 101 to be displayed in display region 303 and statement node 103 to be displayed in display region 305, as shown in FIG. 8D. Accordingly, a user may navigate up one or more flowcharts by selecting a node in display region 301.

It should be recognized that a user may similarly navigate between two flowcharts logically linked together by selecting the nodes displayed in regions 301 and 305. For example, with reference to FIG. 5, a user may select node 111 of flowchart 100 in display region 305 to navigate down from flowchart 200 to flowchart 100. In another example, with reference to FIG. 6, a user may select node 203 of flowchart 200 in display region 301 to navigate up from flowchart 100 to flowchart 200. In some cases, graphical user interface 300 may only permit the user to navigate down the flowchart and restrict the user from navigating up the flowchart. Such a restriction prevents users from changing their selections and may be a useful feature when collecting user information.

4. Creating and Editing a Flowchart

Figure 9B:
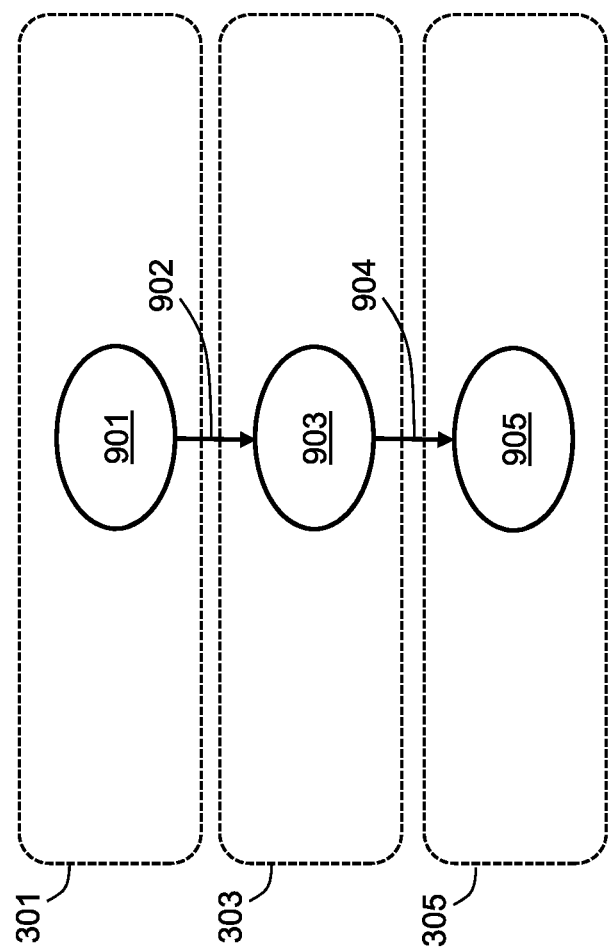

FIGS. 9A-9B depict an exemplary process for adding a node to a flowchart using an exemplary graphical user interface. With reference to FIG. 9A, graphical user interface 300 may be displayed. Graphical user interface 300 may include display regions 301, 303, and 305. Each display region may be for displaying one or more nodes of one or more flowcharts. The total number of display regions in graphical user interface 300 may be less than the total number of hierarchical levels in the one or more flowcharts.

As shown in FIG. 9A, a portion of a flowchart is displayed. Nodes 901 and 903 of the flowchart are displayed in display region 301 and 303 respectively. Logic path 902 connects from node 901 to node 903. Instructions to add node 905 to node 903 of the flowchart may be inputted via graphical user interface 300. With reference to FIG. 9B, receiving such instructions may cause node 905 to be displayed in display region 305. Logic path 904 connects node 903 to node 905. In an example where node 903 is a statement node, only one node may be added to node 903 using graphical user interface 300. In an example where node 905 is a decision node, two nodes may be added to node 903 using graphical user interface 300. In such an example, the two added nodes may be displayed in display region 305 and two logic paths may connect from node 903 to the two added nodes in display region 305. In some cases, the created flowchart may be a streamlined flowchart. Accordingly, graphically user interface 300 may be used to easily add a node to a flowchart.

Figure 10B:
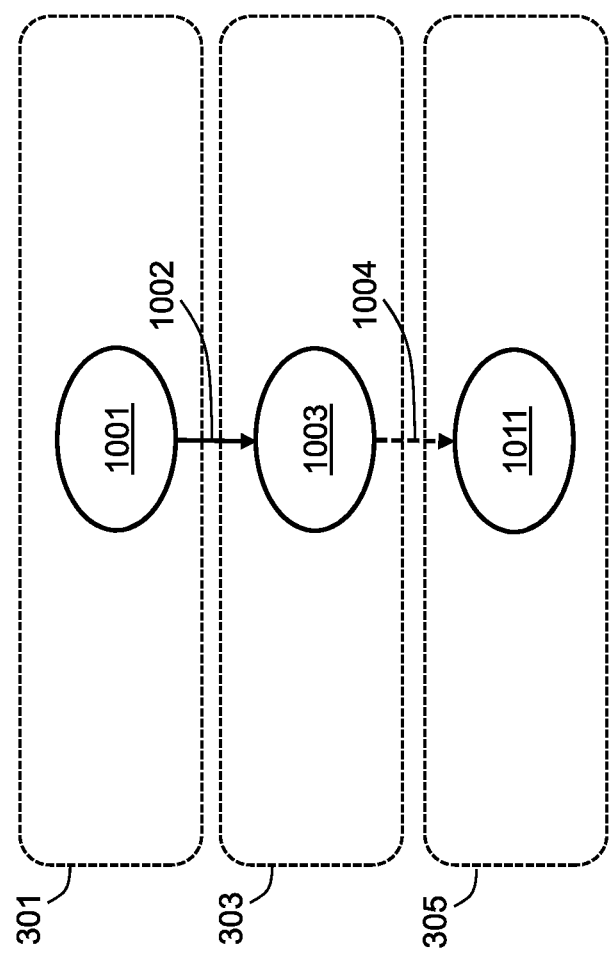

FIGS. 10A-10B depict an exemplary process for logically linking a first flowchart to a second flowchart using an exemplary graphical user interface. With reference to FIG. 10A, graphical user interface 300 may be displayed. Graphical user interface 300 may include display regions 301, 303, and 305. Each display region may be for displaying one or more nodes of one or more flowcharts. The total number of display regions in graphical user interface 300 may be less than the total number of hierarchical levels in the one or more flowcharts.

As shown in FIG. 10A, a portion of a first flowchart is displayed. Nodes 1001 and 1003 of the first flowchart are displayed in display region 301 and 303 respectively. Logic path 1002 connects from node 1001 to node 1003. Instructions to logically link node 1003 of the first flowchart to node 1011 of a second flowchart may be inputted via graphical user interface 300. With reference to FIG. 10B, receiving such instructions may cause node 1011 to be displayed in display region 305. Logic path 1004 connects node 1003 to node 1011. In some cases, the first and the second flowcharts may be streamlined flowcharts. Accordingly, graphically user interface 300 may be used to logically link one flowchart to another flowchart.

Figure 11A:
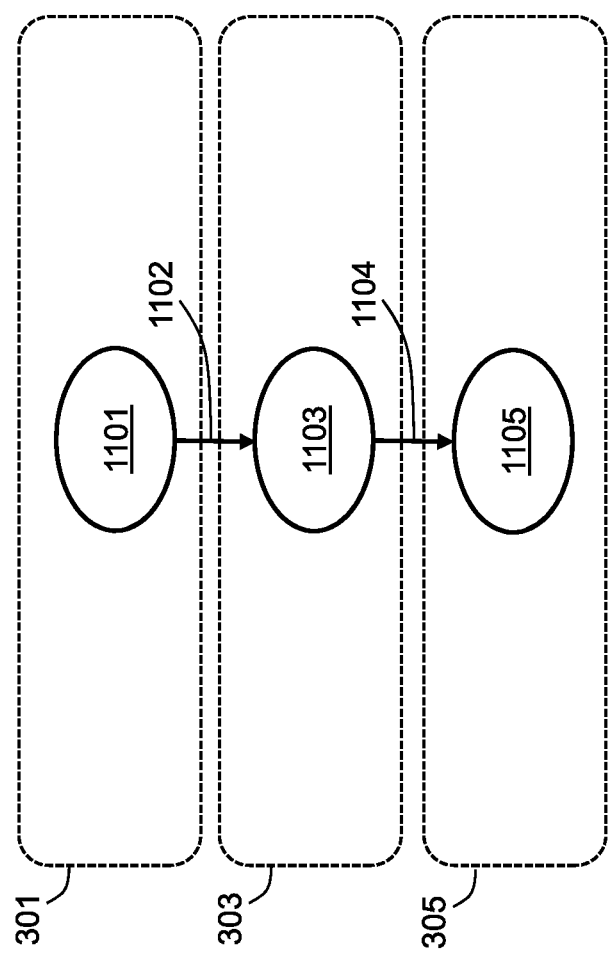
FIGS. 11A-11C illustrate an exemplary process for inserting a node between two existing nodes in a flowchart using an exemplary graphical user interface.
Figure 11B:
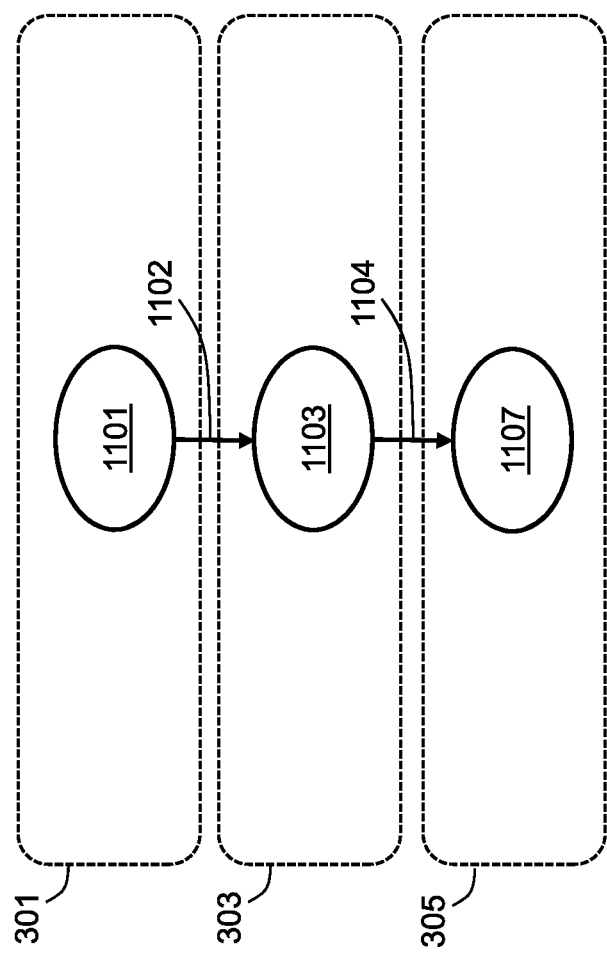
Figure 11C:
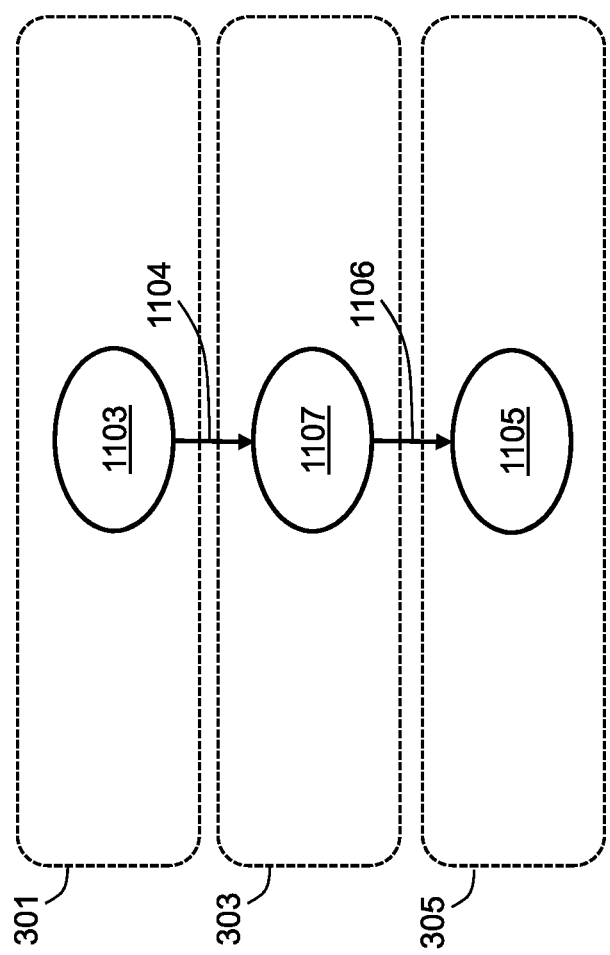

FIGS. 11A-11C depict an exemplary process for inserting a node between two existing nodes in a flowchart using an exemplary graphical user interface. With reference to FIG. 11A, graphical user interface 300 may be displayed. Graphical user interface 300 may include display regions 301, 303, and 305. Each display region may be for displaying one or more nodes of one or more flowcharts. The total number of display regions in graphical user interface 300 may be less than the total number of hierarchical levels in the one or more flowcharts.

As shown in FIG. 11A, a portion of a flowchart is displayed. Nodes 1101, 1103 and 1105 of the flowchart are displayed in display regions 301, 303, and 305 respectively. Logic path 1102 connects from node 1101 to node 1103 and logic path 1104 connects from node 1103 to node 1105. Instructions to insert node 1107 of the flowchart between nodes 1103 and 1105 may be inputted via graphical user interface 300. With reference to FIG. 11B, receiving such instructions may cause node 1107 to be displayed in display region 305 in place of node 1105. Additionally, by inserting node 1107 between nodes 1103 and 1105, logic path 1104 is modified to connect from node 1103 to node 1107 and new logic path 1106 connects from node 1107 to node 1105. It should be recognized that instead of modifying logic path 1104, logic path 1104 may alternatively be deleted and a new logic path may be created to connect from node 1103 to node 1107. Node 1107 in display region 305 may be selected via input to graphical user interface 300. With reference to FIG. 11C, selecting node 1107 may cause node 1103 to be displayed in display region 301, node 1107 to be displayed in display region 303, and node 1105 to be displayed in display region 307. In some cases, the flowchart to which a node is inserted may be a streamlined flowchart. Accordingly, graphically user interface 300 may be used to easily insert a node between two existing nodes in a flowchart.

5. Graphical User Interface Features for Assisting in Navigating a Flowchart

Figure 12:
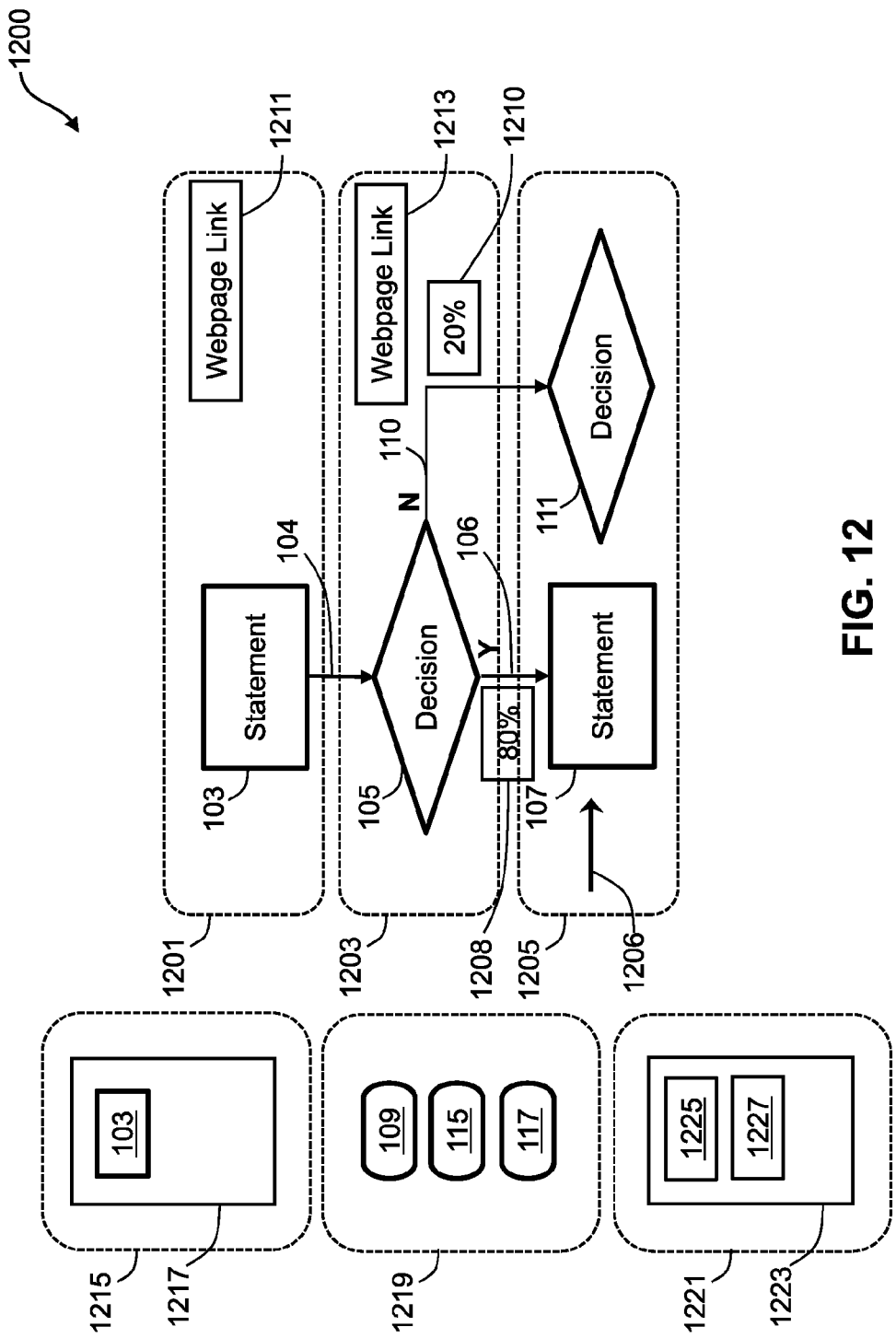
FIG. 12 illustrates an exemplary graphical user interface having features for assisting a user in navigating one or more flowcharts.

FIG. 12 depicts an exemplary graphical user interface 1200 for creating, editing, and navigating through one or more flowcharts. As shown in FIG. 12, graphical user interface 1200 includes display regions 1201, 1203, and 1205. In this example, display regions 1201, 1203, and 1205 display a portion of flowchart 100 (nodes 103, 105, 107 and 111) that logically flow together. Graphical user interface 1200 may include several features which assist a user in navigating through one or more flowcharts. The features are described below in detail.

One feature for assisting a user in navigating through one or more flowcharts may include identifying a node in a display region of graphical user interface 1200 based on a navigation criterion. The navigation criterion may include, for example, being the most popular result, the lowest cost, the shortest time, or the highest confidence. Identifying a node based on a navigation criterion may help a user determine the appropriate node to select when navigating through the one or more flowcharts. For example, as shown in FIG. 12, node 107 may be identified by displaying arrow 1206. In this example, node 107 may be identified based on the navigation criterion of being the most popular node among nodes 107 and 111 that was selected by previous users. Identifying node 107 may thus help a user determine whether to select node 107 or 111 when navigation through flowchart 100.

It should be recognized that there are various methods of identifying a node based on a navigation criterion. In some cases, a node may be identified by highlighting the node, for example, in bold or in a contrasting color. In other cases, the node may be identified by highlighting the logic path that connects to the node. In yet other cases, the node may be identified by placing an identifying symbol (e.g., a happy face, a star, etc.) next to the node or next to the logic path that connects to the node. Additionally, it should be recognized that multiple nodes and logic paths may be identified based on a navigation criterion. For example, with reference to FIG. 1, an entire logical flow from start node 101 to end node 109 of flowchart 100, which includes nodes 101, 103, 105, 107, 109 and logic paths 102, 104, 106, 108 may be identified based on a navigation criterion. In such an example, the nodes and logic paths may be identified when displayed in graphical user interface 1200.

Another feature for assisting a user in navigating through one or more flowcharts may include displaying information in graphical user interface 1200 that distinguishes between different nodes. For example, as shown in FIG. 12, information 1208 and 1210 may be displayed to distinguish node 107 from node 111. In this example, information 1208 is the percentage of previous users who selected node 107 over node 111 while information 1210 is the percentage of previous users who selected node 111 over node 107. In this way, nodes 107 and 111 are distinguished from each other, thereby assisting a user in determining which node to select when navigating through flowchart 100. It should be recognized that there are various formats for displaying information which distinguishes between nodes. In some cases, the information may be numeric (e.g., percentages, estimated times, dollar costs, etc.). In other cases, the information may be graphical (e.g., stars for representing popularity information, clocks for representing estimated time, dollar signs for representing cost, etc.). It should also be recognized that the information may be displayed anywhere in graphical user interface 1200. In some cases, the information may be displayed next to the nodes being distinguished. In other cases, as shown in FIG. 12, the information may be displayed next to the logic paths that connect to the nodes being distinguished.

Yet another feature for assisting a user in navigating through one or more flowcharts may include displaying a webpage link in graphical user interface 1200. The webpage link, when selected, may cause display of a webpage that provides information related to at least one node displayed in display regions 1201, 1203, or 1205. The information may help the user validate or carry out a step represented by the node. In the example shown in FIG. 12, webpage links 1211 and 1213 are displayed in display regions 1201 and 1203 respectively. Webpage links 1211, when selected, may cause display of a webpage providing information on how to carry out instructions set forth in statement node 103. Webpage link 1213, when selected, may cause display of a webpage providing information that helps a user make a decision set forth in decision node 105. It should be recognized that any number of webpage links may be displayed in graphical user interface 1200 and that the webpage links may be displayed anywhere in graphical user interface 1200. Each webpage link may be associated with a particular node displayed in a display region.

As shown in FIG. 12, a task list 1223 may be displayed in graphical user interface 1200. Task list 1223 may be based on the tasks described in the statement nodes of flowchart 100. Task list 1223 may help a user understand the various tasks required to reach an end node and thus assist the user in navigating through flowchart 100. With reference to FIG. 1, statement node 103 may include a first task and statement node 107 may include a second task. With reference to FIG. 12, task list 1223 may thus include first task 1225 and second task 1227. Task list 1223 may be displayed in task display region 1221 of graphical user interface 1200.

As depicted in FIG. 12, graphical user interface 1200 may include a history display region 1215 for displaying a selection history 1217 of a user. Selection history 1217 includes the nodes that a user had previously selected and navigated through in the one or more flowcharts. Displaying selection history 1217 may help a user keep track of previously selected nodes and thus assist the user in navigating through the one or more flowcharts. Additionally, a node in selection history 1217 may be selected by the user to quickly navigate the user back to that node in the one or more flowcharts. In the present example shown in FIG. 12, node 103 was previously selected by the user. Thus, history display region 1215 may display selection history 1217 that includes node 103. Node 103 displayed in history display region 1211 may be selected via input to graphical user interface 1200. Selecting node 103 in history display region 1211 may cause display of node 101 in display region 1201, node 103 in display region 1203, and node 105 in display region 1205. Accordingly, the user may easily navigate back to a previously selected node by displaying selection history 1217 in graphical user interface 1200.

As shown in FIG. 12, graphical user interface 1200 may also include an outcome display region 1219 for displaying the relevant end nodes of one or more flowcharts. Relevant end nodes are the end nodes in the one or more flowcharts that logically flow from the node displayed in display region 1203. Thus, the relevant end nodes define the possible outcomes of a user as the user navigates down the one or more flowcharts. Understanding the possible outcomes helps a user determine whether a node should be selected and thus assists the user in navigating through the one or more flowcharts. In the example shown in FIG. 12, node 105 of flowchart 100 is displayed in display region 1203. With reference to FIG. 1, end nodes 109, 115, and 117 logically flow from node 105. Therefore, in this example, the relevant end nodes include end nodes 109, 115, and 117. As shown in FIG. 12, relevant end nodes 109, 115, and 117 may be displayed in outcome display region 1219. It should be recognized that the relevant end nodes may dynamically change as a user navigates down the one or more flowcharts. For example, with reference to FIG. 1, a user may navigate from node 105 to node 111 of flowchart 100 where only end nodes 115 and 117 logically flow from node 111. End node 109 does not logically flow from node 111 since reaching end node 109 from node 111 would require navigating back up flowchart 100. Thus the relevant end nodes include end nodes 115 and 117, but not end node 109. With reference to FIG. 12, navigating to node 111 thus may cause display of node 111 in display region 1203 and cause display of the relevant end nodes 115 and 117 in outcome display region 1219.

6. System and Environment for Creating, Editing, and Navigating a Flowchart

Figure 13:
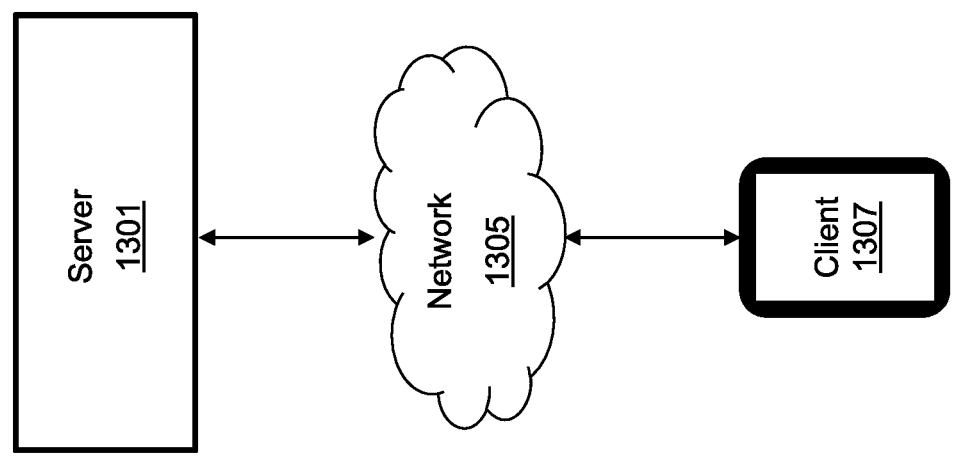
FIG. 13 illustrates an exemplary system and environment for carrying out aspects of the processes described herein.

FIG. 13 illustrates an exemplary system 1300 and environment for carrying out aspects of the process described herein. As shown in FIG. 13, client device 1307 connects to server system 1301 via a network 1305. Client device 1307 may be any computing device capable of displaying a graphical user interface. For example, client computer may be a mobile device (e.g., smart phone, tablet computer, PDA, game consoles, etc.), a notebook computer, or a desktop computer. In some cases, client device 1307 may run client software such as an internet browser (i.e., web browser), flash plug-ins, and any other software useful to show web pages to the computer user. Additionally, client device 1307 may be configured to receive a message from server 1301 by email, Short Message Service (SMS), Multimedia Message Service (MMS), or instant messaging (IM).

Network 1305 may be a TCP/IP network (i.e., Internet network). In other cases, network 1305 may be a LAN (local area network), WAN (wide area network), wireless network, point-to-point network, or other configurations. Server 1301 and client device 1307 may communicate using TCP/IP and, at a higher network level, use other common Internet protocols to communicate, such as HTTP, FTP, AFS, WAP, etc.

In one example, a user of client device 1307 may use a web browser to transmit, across network 1305, a request for a web page having the graphical user interface described herein. The request may be, for example, a URL (uniform resource locator) for the web page. Server system 1301 may receive the request from client device 1307 and in response, may package and transmit across network 1305, the requested web page to client device 1307, thereby causing display of the graphical user interface described herein on the display screen of client device 1307. Additionally, server system 1301 may receive, via the graphical user interface displayed on client device 1307, various requests, instructions, or selections to create, edit, and navigate through one or more flowcharts. In response to such requests, instructions, or selections, server system 1301 may, as described herein, cause display of various nodes of one or more flowcharts in the graphical user interface displayed on client device 1307.

It should be recognized that causing display of the graphical user interface described herein includes causing display of the graphical user interface on a user device where the entire graphical user interface may be viewed by scrolling or panning. Similarly, causing display of a node in a display region of the graphical user interface includes displaying the node on a user device where the node may be viewed by scrolling or panning.

Server system 1301 and client device 1307 may be computer systems, such as, personal computers, computer work stations, or computer servers. An exemplary computer system is described in detail below with reference to FIG. 14.

Figure 14:
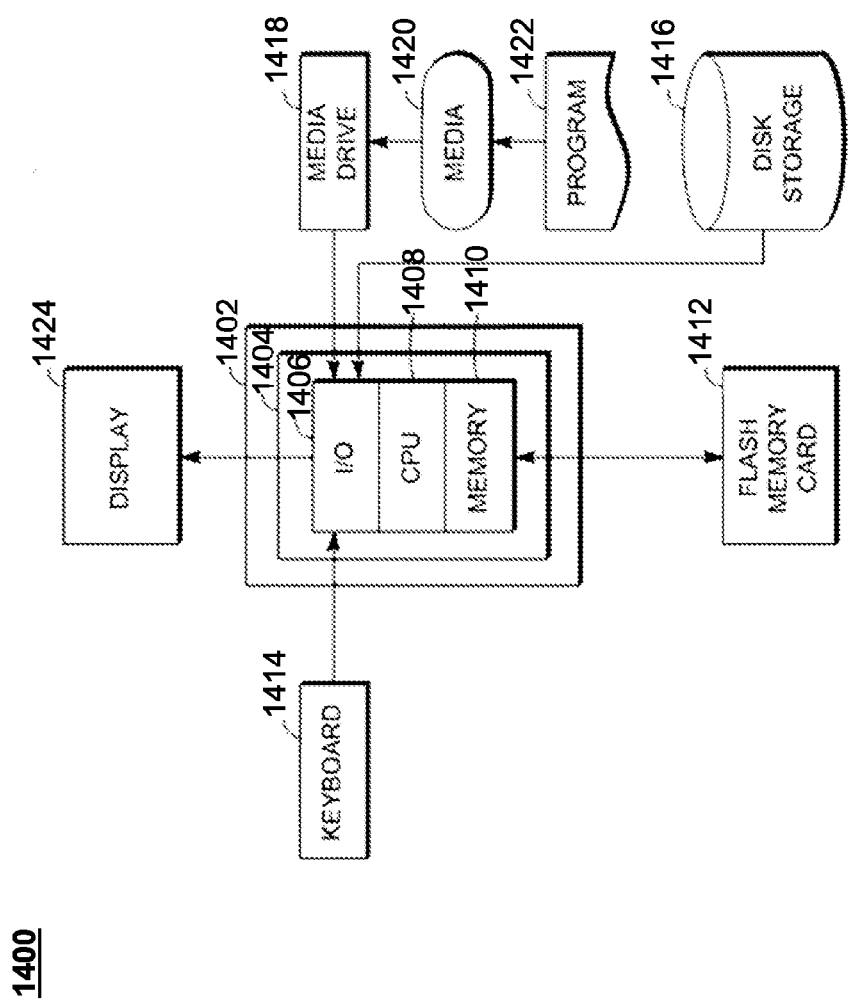
FIG. 14 illustrates an exemplary computing system.

FIG. 14 depicts computing system 1400 with a number of components that may be used to perform the above-described processes. The main system 1402 includes a motherboard 1404 having an input/output ("I/O") section 1406, one or more central processing units ("CPU") 1408, and a memory section 1410, which may have a flash memory card 1412 related to it. The I/O section 1406 is connected to a display 1424, a keyboard 1414, a disk storage unit 1416, and a media drive unit 1418. The media drive unit 1418 can read/write a computer-readable medium 1420, which can contain programs 1422 and/or data.

Where computer system 1400 is a server system, programs 1422 may include code for displaying and operating the graphical user interface described herein. In one example, programs 1422 may include a web page having the graphical user interface described herein. The web page may be written in hyper-text mark-up language (HTML).

Where computer system 1400 is a client device, programs 1422 may include a web browser application. The memory section 1410 can store a downloaded web page having the graphical user interface described herein. CPU 1408 may execute the web browser application code to display the downloaded web page having the graphical user interface described herein on display 1424.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

What is claimed is:

1. A computer implemented method for creating, editing, and navigating one or more flowcharts, the method comprising:
   causing display of a graphical user interface having a plurality of display regions, the plurality of display regions including at least a first, a second, and a third display region, wherein:
      each display region is for displaying a node of a plurality of nodes in the one or more flowcharts,
      the plurality of nodes are connected by a plurality of logic paths,
      the one or more flowcharts include a plurality of hierarchical levels, and
      the total number of display regions is less than the total number of hierarchical levels;
   causing display of a first node in the first display region a second node in the second display region, and a third and fourth node in the third display region, wherein a first logic path connects from the first node to the second node, a second logic path connects from the second node to the third node and a third logic path connects from the second node to the fourth node, wherein the second logic path is displayed with a visual indicator associated with a characteristic corresponding to the third node and the third logic path is displayed with a visual indicator associated with a characteristic corresponding to the fourth node, wherein the characteristic is at least one of a popularity, a cost, and a time, wherein the third display region is displayed with an icon next to either the third node or the fourth node based on determining which node is associated with at least one of a most popular result, a lowest cost, and a shortest time; and
   causing display of an outcome display region, the outcome display region dynamically displaying only possible end nodes that logically flow from the second node in the second display region according to the one or more flow charts.

2. The computer implemented method of claim 1, wherein a first flowchart includes the first, second, and third nodes and the first and second logic paths.

3. The computer implemented method of claim 1, wherein a first flowchart includes the first node, the second node, and the first logic path and a second flowchart includes the third node, and wherein the second logic path logically links the first flowchart to the second flowchart.

4. The computer implemented method of claim 1, wherein a first flowchart includes the first node, a second flowchart includes the second node, the third node, and the second logic path, and the first logic path logically links the first flowchart to the second flowchart.

5. The computer implemented method of claim 1, further comprising:
   receiving, via input to the graphical user interface, a selection of the third node in the third display region to navigate down the one or more flowcharts; and
   causing display of the second node in the first display region, the third node in the second display region, and a fifth node in the third display region, wherein a fourth logic path connects from the third node to the fifth node.

6. The computer implemented method of claim 1, further comprising:
   receiving, via input to the graphical user interface, a selection of the first node in the first display region to navigate up the one or more flowcharts; and
   causing display of the first node in the second display region and the second node in the third display region.

7. The computer implemented method of claim 1, wherein the graphical user interface only permits the user to navigate down the flowchart and restricts the user from navigating back up the flowchart.

8. The computer implemented method of claim 1, wherein a first flowchart includes the first, second, and third nodes and the first and second logic paths, and further comprising:
   receiving, via input to the graphical user interface, instructions to insert a fifth node between the second node and the third node of the first flowchart, wherein the second logic path is modified to connect from the second node to the fifth node and a fourth logic path of the first flowchart connects from the fourth node to the third node; and
   causing display of the fifth node in place of the third node in the third display region.

9. The computer implemented method of claim 1, further comprising causing display of a webpage link in the graphical user interface, wherein the webpage link, when selected, causes display of a webpage, the webpage providing information relating to at least one of the first node, the second node, and the third node.

10. The computer implemented method of claim 1, wherein the graphical user interface includes a history display region for displaying a selection history of a user, wherein the first node was previously selected by the user, and further comprising causing display of the selection history in the history display region, the selection history including the first node, wherein the first node of the selection history, when selected, causes display of the first node in the second display region and the second node in the third display region.

11. The computer implemented method of claim 1, further comprising:
receiving, via input to the graphical user interface, instructions to create a bookmark for the second node, wherein the bookmark, when selected, causes display of the first node in the first display region and the second node in the second display region.

12. The computer implemented method of claim 1, wherein the plurality of nodes includes at least one statement node having a task, and further comprising causing display of a task list, wherein the task list includes the task.

13. The computer implemented method of claim 1, wherein the second node includes a question statement, and wherein the second logic path corresponds to an affirmative response to the question statement and the third logic path corresponds to a negative response to the question statement.

14. The computer implemented method of claim 1, further comprising identifying the third node based on a navigation criterion.

15. The computer implemented method of claim 1, further comprising causing display of information in the graphical user interface, wherein the information distinguishes the third node from the fourth node in the third display region.

16. The computer implemented method of claim 1, wherein a first flowchart includes the first node, the second node, and the first logic path, and further comprising:
receiving, via input to the graphical user interface, instructions to add a third node to the first flowchart, wherein a second logic path of the first flowchart connects from the second node to the third node; and
causing display of the third node in the third display region.

17. The computer implemented method of claim 1, wherein a first flowchart includes the first node, the second node, and the first logic path, and further comprising:
receiving, via input to the graphical user interface, instructions to logically link the second node of the first flowchart to a third node of a second flowchart, wherein a second logic path connects from the second node to the third node; and
causing display of the third node in the third display region.

18. The computer implemented method of claim 1, wherein:
each flowchart represents a process,
the process is a decision-making process or a goal reaching process,
each node in each flowchart represents a step in the process, and
the second node represents the step in the process currently under consideration by the user.

19. The computer implemented method of claim 1, wherein the second display region displays at most one node of the one or more flowcharts and wherein at most three logic paths connecting to the node in the second display region logically flow from the node in the second display region.

20. The computer implemented method of claim 1, wherein the number of display regions equals to three or four.

21. The computer implemented method of claim 1, wherein the second node includes a statement or a question having a character length less than or equal to 160.

22. The method of claim 1, wherein the characteristic indicates a percentage of previous user selections.

23. The method of claim 1, wherein the characteristic is associated with a predefined user preference.

24. The method of claim 1, wherein the visual indicator comprises highlighting at least one of the second and third logic paths so as to be visually distinguishable from the other.

25. The method of claim 1, wherein the visual indicator comprises displaying a numerical value with at least one of the second and third logic paths.

26. The method of claim 1 wherein the visual indicator difference comprises displaying an icon with at least one of the second and third logic paths.

27. A server system comprising:
at least one processor; and
a non-transitory computer readable memory storing computer-readable instructions that, when executed by the at least one processor, causes the system to:
display on a client device, a graphical user interface having a plurality of display regions, the plurality of display regions including at least a first, a second, and a third display region, wherein:
each display region is for displaying a node of a plurality of nodes in one or more flowcharts,
the plurality of nodes are connected by a plurality of logic paths,
the one or more flowcharts include a plurality of hierarchical levels, and
the total number of display regions is less than the total number of hierarchical levels; and
display on the client device, a first node in the first display region, and a second node in the second display region, and a third and fourth node in the third display region, wherein a first logic path connects from the first node to the second node, a second logic path connects from the second node to the third node and a third logic path connects from the second node to the fourth node, wherein the second logic path is displayed with a visual indicator associated with a characteristic corresponding to the third node and the third logic path is displayed with a visual indicator associated with a characteristic corresponding to the fourth node, wherein the characteristic is at least one of a popularity, a cost, and a time, wherein the third display region is displayed with an icon next to either the third node or the fourth node based on determining which node is associated with at least one of a most popular result, a lowest cost, and a shortest time; and
display an outcome display region, the outcome display region dynamically displaying only possible end nodes that logically flow from the second node in the second display region according to the one or more flow charts.

* * * * *